United States Patent [19]

Mutzner et al.

[11] 4,111,237

[45] Sep. 5, 1978

[54] BRAID REINFORCED FLEXIBLE BRAKE HOSE

[75] Inventors: John E. Mutzner, Covington; Gary P. Ford, Dayton, both of Ohio

[73] Assignee: General Motors Corporation, Detroit, Mich.

[21] Appl. No.: 704,663

[22] Filed: Jul. 12, 1976

[51] Int. Cl.² ............... F16L 11/04; F16L 11/08
[52] U.S. Cl. ............................ 138/125; 138/126
[58] Field of Search ......... 138/124, 125, 126, DIG. 2, 138/123

[56] References Cited

U.S. PATENT DOCUMENTS

| 2,512,433 | 6/1950 | Leben | 138/126 |
| 3,011,525 | 12/1961 | Randle et al. | 138/126 |
| 3,177,900 | 4/1965 | Sharp | 138/125 |
| 3,682,202 | 8/1972 | Buhrmann et al. | 138/126 |
| 3,750,712 | 8/1973 | Brand | 138/124 |
| 3,812,885 | 5/1974 | Sajben et al. | 138/125 |
| 3,953,270 | 4/1976 | Ford | 138/124 |

FOREIGN PATENT DOCUMENTS

| 1,247,771 | 8/1967 | Fed. Rep. of Germany | 138/125 |
| 1,525,787 | 9/1969 | Fed. Rep. of Germany | 138/125 |
| 2,522,288 | 12/1975 | Fed. Rep. of Germany | 138/125 |
| 930,573 | 7/1963 | United Kingdom | 138/125 |
| 1,192,294 | 5/1970 | United Kingdom | 138/126 |

Primary Examiner—Richard E. Aegerter
Assistant Examiner—James E. Bryant, III
Attorney, Agent, or Firm—George A. Grove

[57] ABSTRACT

In a preferred embodiment a hydraulic brake hose comprises a polychloroprene inner tube, a reinforcing braid of twisted glass fiber yarn around the tube, a styrene-butadiene copolymer rubber cushion layer over the glass braid, a second reinforcing braid of nylon fiber yarn over the cushion layer and a cover layer of polychloroprene rubber.

3 Claims, 1 Drawing Figure

U.S. Patent     Sept. 5, 1978     4,111,237
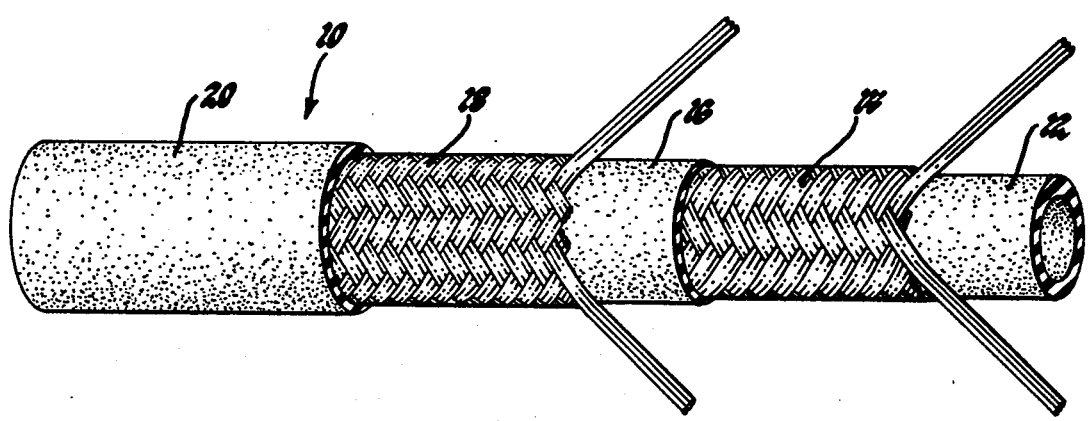

BRAID REINFORCED FLEXIBLE BRAKE HOSE

This invention pertains to reinforced elastomeric hydraulic brake hose. More specifically, this invention pertains to a hydraulic brake hose employing a specific combination of reinforcing materials, an inner braid of glass fiber yarn and an outer braid of nylon fiber yarn, to provide a hose of unusual strength and durability.

It is known to make motor vehicle brake hose of polychloroprene rubber or other suitable elastomeric material that is compatible with the ethylene glycol base brake fluid or other brake fluid and resistant to the environment of the automobile engine compartment and underside. A typical brake hose comprises an inner tube of polychloroprene rubber, a reinforcing layer of suitable fibrous material, a cushion layer of suitable elastomeric material, a second fiber reinforcing layer and a polychloroprene cover. Several different materials have been used, generally braided, as brake hose reinforcement including cotton, rayon, polyester, polyvinyl alcohol and some mixtures and combinations thereof. A superior durable and cost effective fiber material employed in both reinforcing layers has been rayon fiber yarn. However, with the virtual end of the use of rayon fibers as automobile tire cord material, the supply of suitable rayon fiber is uncertain.

It is an object of the present invention to provide a hydraulic brake hose particularly suitable for use in motor vehicles that does not employ rayon fiber as a reinforcing material but meets or surpasses the excellent qualities of a rayon fiber reinforced hose.

It is a more specific object of our invention to provide an elastomeric hydraulic brake hose construction having two reinforcing braided layers wherein the inner layer is a braid of twisted glass fiber yarn and the outer layer is a braid of nylon fiber yarn. The two reinforcing layers are separated by an elastomeric cushion layer.

It is a still more specific object of our invention to provide a brake hose construction employing an inner tube of polychloroprene rubber, a reinforcing braid of twisted glass fiber yarn, a cushion layer of styrene-butadiene copolymer rubber, a reinforcing braid of untwisted nylon fiber yarn and an outer cover layer of polychloroprene rubber.

These and other objects of our invention are accomplished as follows.

In accordance with a preferred embodiment of our invention, a brake hose is made by first extruding a layer of polychloroprene rubber over a mandrel of suitable diameter. The nominal internal diameter of typical automotive hydraulic brake hose is ⅛ inch or 3/16 inch. A reinforcing wrap of twisted glass fiber yarn is then braided tightly over the extruded tube of polychloroprene rubber. Preferably, the braid angle of this glass fiber wrap is nominally 54° (e.g., 52°-56°) with respect to the axis of the tube. A relatively thin cushion layer of styrene-butadiene copolymer rubber is then wrapped over the glass braid. A second reinforcing layer is then formed over the cushion by braiding untwisted nylon fiber yarn onto the cushion layer. The angle of the nylon braid with respect to the axis of the tube is suitably 40° to 60°. A cover layer of uncured polychloroprene rubber is then extruded over the nylon braid. This five-layer construction plus mandrel is then heated with high pressure steam until the several rubber layers are cured. The mandrel is then forced out of the hose. The hose is cut into suitable lengths and end fittings are attached for assembly on a motor vehicle.

As those skilled in the art know, a hydraulic brake hose construction must pass many different tests before it is considered satisfactory for use in a vehicle. At least two of the tests measure the suitability of the reinforcing materials employed in the hose. One test is the volumetric expansion test as defined by ASTM procedure D571. Here, a number of sections of hose, each equipped with fittings, are filled with water under pressures of 1,000 psi and 1,500 psi, respectively. The volumetric expansion of each hose section is measured. It is desired that the volumetric expansion of a brake hose under pressure be minimal. For example, in the case of ⅛ inch ID hose a volumetric expansion of no more than 0.33 cc/ft at 1,000 psi and 0.42 cc/ft at 1,500 psi is required.

The second test is a whip test. This test is also carried out in accordance with ASTM procedure D571. In the whip test, a number of sections of hose equipped with fittings are gripped at the ends and whipped about like a jump rope until they rupture. This is a measure of the hose's ability to function under the dynamic conditions encountered by a motor vehicle. A minimum whip test life of coupled hose assemblies of at least 35 hours is deemed necessary.

Included among the fibrous materials evaluated as substitutes for rayon in hydraulic brake hose constructions were glass fiber yarns and nylon fiber yarns. We found that when a glass fiber reinforcement was employed in a hose construction in both of the reinforcing layers, the hose failed to pass the whip test. We also found that when nylon fibers were employed in both of the reinforcing layers, the hose failed to pass the volumetric expansion test. However, we discovered that when glass fibers were employed in the inner layer and nylon fibers employed as the outer reinforcing layer, a hose with excellent properties was produced which passed both the whip test and the volumetric expansion test as well as all other hose tests. If the arrangement of glass and nylon braids is reversed, the hose is unsuitable for use as a hydraulic brake hose.

These and other objects and advantages of our invention will be better understood in view of a detailed description thereof which follows. Reference will be made to the drawing which illustrates a portion of reinforced brake hose partly broken away and in section to show the several layers that make up the construction.

Referring to the drawing, a typical brake hose construction 10 in accordance with our invention includes an elastomeric inner tube 12. This inner tube is usually formed by extrusion of a suitable uncured elastomeric material, such as e.g. polychloroprene rubber or ethylene-propylene-diene terpolymer rubber. In many motor vehicle brake hose applications this tube has a nominal internal diameter of ⅛ inch or 3/16 inch. The tube may be about 0.040-0.070 inch thick. Tightly wound over inner tube 12 is a braided glass yarn layer 14. Reinforcing layer 14 is formed of twisted glass fiber yarn preferably braided at an angle of 54° to the axis of the tube. As shown, a single braid layer of glass yarn packages, each containing three ends (bundles), is suitable. A cushion layer 16 of elastomeric material, such as styrene-butadiene copolymer rubber, is formed over the glass braid. The cushion layer is typically about 0.018 inch thick. A second reinforcing layer of tightly wrapped nylon braid 18 is applied over cushion layer 16. The nylon braid is suitably formed of a three-end package of untwisted multifilament yarn braided at an angle of 40° to 60° with respect to the axis of the hose.

Finally, a cover layer 20 of suitable elastomeric material, such as neoprene or ethylene-propylene-diene terpolymer rubber, is formed over the nylon braid. Cover layer 20 is suitably 0.040 inch thick. The elastomeric materials are cured as described above.

The practice of our invention will further be illustrated by several specific examples.

EXAMPLE 1

Several pieces of reinforced flexible brake hose were formed, each of ⅛ inch internal diameter. The hose pieces each had a polychloroprene inner tube, a reinforcing glass braid layer, a styrene-butadiene copolymer cushion layer, a reinforcing nylon braid layer and a polychloroprene cover layer.

In this example, each hose had a glass braid formed of a three-end package of multifilament twisted fiber glass fiber yarn (the glass fibers having a designation H15 1/0). The yarn was twisted at five turns per inch. The glass fibers had been treated with a resorcinol-formaldehyde latex coating. The coating may make up 12% to 20% by weight of the glass fiber yarn. When the hose is heated to cure the elastomers therein, the latex also cures to bond the fibers to each other and the braid to the adjacent elastomer layers. The yarn was braided under tension onto the hose using a commercial braiding machine. The braid was formed at an angle of 54.4° to the axis of the hose.

In each of the pieces of brake hose formed in accordance with this example, the second or outer reinforcing braid layer was formed of nylon 66 untwisted yarn (1680 denier) in packages containing three ends or bundles. The nylon yarn was treated in a resorcinol-formaldehyde latex to provide a coating of 5% to 8% by weight of the latex. The fibers had also been heat-set, i.e., they were processed so that any shrinkage would be minimized during high temperature curing of the elastomer portions of the brake hose. The nylon braid was likewise applied with a commercial braiding machine at an angle of 54.4° to the axis of the tube.

Sections of this brake hose were subjected to the several tests reqired of brake hose for use in motor vehicles. The hose construction of this example passed all tests and is considered suitable for use as a hydraulic brake hose. Of particular interest with respect particularly to the braided reinforcing layers were the whip tests and the volumetric expansion tests described above. Of the several pieces of hose subjected to the whip test, the minimum life was 113.8 hours and the average life was 118.1+ hours. The volumetric expansion of the ⅛ inch ID hose subjected to water pressure at 1,000 psi was 0.16 cc/ft and the volumetric expansion of the hose subjected to a hydraulic pressure of 1,500 psi was 0.19 cc/ft. These properties, provided principally by the reinforcing layers, are very good and far exceed the standards.

As was noted above, when brake hose was formed employing a reinforcing glass braid on both the first and second reinforcing layers, all sections of hose tested failed to pass the whip test which requires a minimum of 35 hours. Likewise, when hose sections were made with both reinforcing layers of nylon, all pieces failed to pass the volumetric expansion test which requires that the volumetric expansion be no greater than 0.33 cc/ft at 1,000 psi and 0.42 cc/ft at 1,500 psi for ⅛ inch diameter hose.

For further purposes of comparison, it is to be noted that a brake hose of the same construction as those made in this example, except that the reinforcing braids were both of rayon fibers, has an average whip life of 91.5 hours and a volumetric expansion at 1,000 psi of 0.19 cc/ft and at 1,500 psi of 1.24 cc/ft. Thus, the brake hose of the present invention has physical properties that are better than the same physical properties of commercial brake hose using rayon reinforcing braid.

EXAMPLE 2

A number of pieces of ⅛ inch ID brake hose were made as in Example 1 except that the glass yarn employed for the inner reinforcing braid was twisted at a rate of only three turns per inch. The glass braid was applied at an angle of 54.4° with respect to the axis of the brake hose and the glass was otherwise like that material employed in Example 1. The nylon reinforcing layer was like that employed in Example 1. Thus, the brake hose was the same as that of Example 1 except that a glass fiber yarn with a lower degree of twist was employed. After the hose was cured and cut to suitable lengths for testing, it was found that the average whip life of the sections of hose was 135.1 hours and the minimum whip life was 133 hours. The volumetric expansion of this ⅛ inch ID hose was 0.11 cc/ft at 1,000 psi hydraulic pressure and volumetric expansion at 1,500 psi was 0.14 cc/ft.

EXAMPLE 3

Several pieces of brake hose were prepared as in Example 1 except that the glass reinforcing yarn had a still lower degree of twist—1.5 turns per inch. The glass yarn was braided on the polychloroprene inner tube at an angle of 54.4° as in the previous example. After the styrene-butadiene copolymer rubber cushion was applied, a nylon braid, the same as employed in the previous examples, was formed. The minimum whip life of sections of this ⅛ inch ID hose was 96.7 hours and the average whip life was 103.3 hours. The volumetric expansion at 1,000 psi and 1,500 psi were, respectively, 0.11 cc/ft and 0.14 cc/ft. Thus, the glass reinforcing braid may be formed using glass yarn of varying degrees of twist and still provide a brake hose of exceptionally good physical qualities.

EXAMPLE 4

In this example ⅛ inch ID elastomeric brake hose was prepared using the same elastomer materials as in the previous examples. A glass braid was formed using latex treated yarn twisted at 1.5 turns per inch. The braid was applied at an angle of 54.4° to the axis of the hose. After the elastomeric cushion layer was formed, a latex treated, untwisted, heat-set nylon yarn braid was applied at a braid angle of 43°. In general, it is found that as the braid angle is decreased the reinforcing strength decreases, while the rate at which the braid is formed is increased. After the hose construction was finished, several pieces were tested and it was found that the whip life was only 59.5 hours. The volumetric expansion at 1,000 psi and 1,500 psi were, respectively, 0.14 cc/ft and 0.18 cc/ft. In this case the whip life was low (although above minimum requirement) for normal brake hose usage. The problem was believed to be in the nylon braid.

EXAMPLE 5

Still another set of hose pieces were made with the elastomeric materials as in the above examples. The inner reinforcing braid was formed of latex treated, twisted (1.5 turns per inch) glass fiber yarn braided at an angle of 54.4°. The nylon braid was again applied at an angle of 43° using latex treated, untwisted, nonheat-set yarn. It was desired to determine whether the nylon yarn could be used at low braid angle if it was not heat-set. Once the hose construction was finished and the hose sections were prepared for testing it was found that those tested displayed a minimum whip life of 149.2 hours and an average whip life of 186.8 hours. The volumetric expansion of the ⅛ inch hose sections tested at 1,000 and 1,500 psi, respectively, were 0.11 cc/ft and 0.15 cc/ft. By using nonheat-set nylon yarn at low braid angles (and all braid angles over a range of about 40° to 60°) a high quality hose is obtained.

Thus, in accordance with our invention is provided novel and useful brake hose constructions employing a glass fiber yarn braid inner reinforcing layer and a nylon fiber yarn braid outer reinforcing layer. When these reinforcing layers are employed in combination with suitable elastomeric hose members, hoses of extraordinarily strong physical properties are obtained. The inner tube portion of the hose is suitably formed of polychloroprene, ethylene-propylene-diene rubber, natural rubber, styrene-butadiene copolymer rubber, chlorosulfonated polyethylene (Hypalon-DuPont) and the like. The cushion layer is suitably formed of natural rubber, styrene-butadiene copolymer rubber, polychloroprene and the like. The cover layer is suitably polychloroprene, ethylene-propylene-diene rubber, chlorosulfonated polyethylene and the like.

The glass fiber braid layer is formed of twisted glass fiber yarn, twisted to a degree of 0.5 to 5 turns per inch. Preferably the fibers are pretreated with a resinous material that encapsulates the fibers and bonds them to the elastomeric layers that surround the braid. We also prefer that the glass fiber layer be applied at a braid angle of 52° to 56° which is optimal from the standpoint of the reinforcing strength of this braid layer.

Furthermore, we prefer to use untwisted nylon fiber yarn (although twisted material is suitable) which is treated with a resorcinol-formaldehyde latex or other suitable resinous coating material that will be compatible with the elastomeric layers of the hose that enclose the nylon braid layer. The nylon braid may be suitably applied at an angle of 40° to 60° with respect to the axis of the hose. It is preferred that the nylon be nonheat-set for improved whip life. If a heat-set nylon yarn is employed, it is preferably braided at a braid angle of 50° or higher.

While our invention has been described in terms of a few preferred specific embodiments thereof, it will be appreciated that other forms could readily be adapted by one skilled in the art. Accordingly, the scope of our invention is to be considered limited only by the following claims.

What is claimed is:

1. A hydraulic brake hose comprising
an elastomeric core tube,
a reinforcing braid of twisted glass fiber yarn wound around said tube braided at an angle of about 52° to 56° to the axis of the tube,
an elastomeric cushion layer covering said glass braid,
reinforcing braid of untwisted nylon fibers over said cushion layer, and
an elastomeric cover layer.

2. A hydraulic brake hose comprising
an elastomeric core tube,
a reinforcing braid of glass fibers twisted at a rate of one-half to five twists per inch and braided at an angle of about 52° to 56° to the axis of the tube,
an elastomeric cushion layer covering said glass braid,
a reinforcing braid of untwisted, nonheat-set nylon fibers over said cushion layer, and
an elastomeric cover layer.

3. A hydraulic brake hose comprising
a polychloroprene core tube,
a reinforcing braid of twisted, resorcinol-formaldehyde, latex coated glass fibers around said tube braided at an angle of about 52° to 56° to the axis of the tube,
an elastomeric cushion layer over said glass braid,
a reinforcing, untwisted braid of nylon fibers over said cushion layer braided at an angle of 40° to 60° to the axis of the tube, and
a polychloroprene cover layer.

* * * * *